(12) United States Patent
Hashimoto et al.

(10) Patent No.: US 8,464,683 B2
(45) Date of Patent: Jun. 18, 2013

(54) ENGINE BALANCER SYSTEM

(75) Inventors: Hisayuki Hashimoto, Saitama (JP); Tomoji Suganami, Saitama (JP); Haruo Watanabe, Tochigi (JP); Kazuhito Okazaki, Tochigi (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/169,652

(22) Filed: Jun. 27, 2011

(65) Prior Publication Data

US 2011/0253091 A1 Oct. 20, 2011

Related U.S. Application Data

(63) Continuation of application No. 12/953,640, filed on Nov. 24, 2010, now Pat. No. 7,992,534, which is a continuation of application No. 11/980,952, filed on Oct. 31, 2007, now Pat. No. 7,841,313, which is a continuation of application No. 11/900,967, filed on Sep. 14, 2007, now Pat. No. 7,418,938, which is a continuation of application No. 11/407,620, filed on Apr. 20, 2006, now Pat. No. 7,270,104, which is a continuation of application No. 10/507,464, filed as application No. PCT/JP03/02765 on Mar. 10, 2003, now Pat. No. 7,047,927.

(30) Foreign Application Priority Data

Mar. 11, 2002 (JP) .................................. 2002-64877

(51) Int. Cl.
*F02B 75/06* (2006.01)

(52) U.S. Cl.
USPC ........................................ 123/192.2; 74/603

(58) Field of Classification Search
USPC .......................................... 123/192.2; 74/603
See application file for complete search history.

(56) References Cited

U.S. PATENT DOCUMENTS

| 4,677,948 A | 7/1987 | Candea |
| 5,535,643 A | 7/1996 | Garza |
| 6,170,453 B1 | 1/2001 | Killion |

(Continued)

FOREIGN PATENT DOCUMENTS

| EP | 1 081 410 A1 | 3/2001 |
| JP | 62-28937 | 2/1987 |

(Continued)

OTHER PUBLICATIONS

Official Communication dated Nov. 8, 2005 issued in corresponding JP 2002-064877.

*Primary Examiner* — Noah Kamen
(74) *Attorney, Agent, or Firm* — Nelson Mullins Riley & Scarborough LLP; Anthony A. Laurentano

(57) ABSTRACT

An engine balancer system is provided in which a balancer housing (17) disposed so as to face an oil pan beneath a crankshaft is formed by joining an upper housing (29) and a lower housing (30) via mating faces (P), and the height of the mating faces (P) is lower on a vehicle front side than on a vehicle rear side. Oil discharge holes (45a, 46) for discharging oil that is within the balancer housing (17) are formed in the mating faces (P) on the higher side of the balancer housing (17) and in the upper housing (29) above the mating faces (P) on the lower side of the balancer housing (17). This enables the position of the oil discharge hole (45a) on the lower side to be as high as possible, thereby suppressing penetration of oil into the interior of the balancer housing (17) through the oil discharge hole (45a).

5 Claims, 19 Drawing Sheets

U.S. PATENT DOCUMENTS

| | | |
|---|---|---|
| 6,189,499 B1 | 2/2001 | Iwata et al. |
| 6,205,970 B1 | 3/2001 | Iwata et al. |
| 6,286,474 B1 * | 9/2001 | Downs et al. .............. 123/192.2 |
| 6,382,165 B1 * | 5/2002 | Hirose et al. ................ 123/192.2 |
| 6,471,008 B1 * | 10/2002 | Iwata ......................... 123/192.2 |
| 6,725,974 B2 * | 4/2004 | Sato et al. .................. 123/192.2 |
| 7,047,927 B2 | 5/2006 | Hashimoto et al. |
| 7,270,104 B2 | 9/2007 | Hashimoto et al. |

FOREIGN PATENT DOCUMENTS

| | | |
|---|---|---|
| JP | 1-83946 | 6/1989 |
| JP | 2-33948 | 3/1990 |
| JP | 10-159906 | 6/1998 |
| JP | 2000-065150 | 3/2000 |
| JP | 2001-074105 | 3/2001 |
| JP | 2001-140985 | 5/2001 |

* cited by examiner

Rr ← → Fr

ENGINE BALANCER SYSTEM

RELATED APPLICATIONS

This is a continuation application of U.S. Ser. No. 12/953,640 filed Nov. 24, 2010, which is a continuation application of U.S. Ser. No. 11/980,952 filed Oct. 31, 2007, now U.S. Pat. No. 7,841,313, which is a continuation application of U.S. Ser. No. 11/900,967 filed Sep. 14, 2007, now U.S. Pat. No. 7,418,938, which is a continuation of U.S. Ser. No. 11/407,620, filed Apr. 20, 2006, now U.S. Pat. No. 7,270,104 B2, which is a continuation of U.S. Ser. No. 10/507,464, filed May 31, 2005, now U.S. Pat. No. 7,047,927 B2, which is a 35 U.S.C. 371 national stage filing of International Application PCT/JP03/02765 filed Mar. 10, 2003, which claims priority to Japanese Patent Application No. 2002-64877, filed Mar. 11, 2002, the contents of which are incorporated herein by reference.

FIELD OF THE INVENTION

The present invention relates to an engine balancer system having a balancer housing formed by joining an upper housing and a lower housing via mating faces, the balancer housing being disposed so as to face an oil pan beneath a crankshaft of an engine.

BACKGROUND ART

Such an engine balancer system is known from Japanese Patent Application Laid-open No. 2001-140985.

In this conventional balancer system, a balancer housing is formed by joining an upper housing and a lower housing, and oil within the balancer housing is discharged via oil discharge holes formed in mating faces of the two housings.

If an engine is mounted in a vehicle body with its cylinder axis inclined, since the mating faces of the upper housing and the lower housing of the balancer housing are also inclined, when oil within an oil pan is agitated there is a possibility that oil might penetrate into the interior of the balancer housing via an oil discharge hole formed in the mating faces on the lower side.

DISCLOSURE OF INVENTION

The present invention has been achieved under the above-mentioned circumstances, and it is an object thereof to suppress the penetration of oil into the interior of the balancer housing via the oil discharge hole even when the balancer housing is provided at an inclination relative to the horizontal direction.

In order to attain this object, in accordance with a first aspect of the present invention, there is proposed an engine balancer system having a balancer housing formed by joining an upper housing and a lower housing via mating faces, the balancer housing being disposed so as to face an oil pan beneath a crankshaft of an engine, and the balancer housing being inclined so that the height of the mating faces varies from one side to the other, wherein oil discharge holes for discharging oil that is within the balancer housing are formed in the mating faces on the higher side of the balancer housing and in the upper housing above the mating faces on the lower side of the balancer housing.

In accordance with this arrangement, since the oil discharge holes for discharging the oil that is within the balancer housing are formed in the mating faces of the upper housing and the lower housing on the higher side of the balancer housing and in the upper housing above the mating faces on the lower side of the balancer housing, oil can easily be discharged on the higher side of the balancer housing, and by setting the oil discharge hole on the lower side of the balancer housing at as high a position as possible, it is possible to suppress the penetration of oil into the interior of the balancer housing via the oil discharge hole.

Furthermore, in accordance with a second aspect of the present invention, in addition to the first aspect, there is proposed the engine balancer system wherein an angle between the lower housing and the mating faces on the lower side of the balancer housing is larger than an angle formed between the lower housing and the mating faces on the higher side of the balancer housing.

In accordance with this arrangement, since the inclination of the lower housing is shallow on the higher side of the balancer housing where it is difficult for oil to be discharged via the oil discharge hole, it becomes easy for oil to be discharged via the oil discharge hole, and since the inclination of the lower housing is steep on the lower side of the balancer housing where it is easy for oil to be discharged via the oil discharge hole, it is possible thereby to contribute to a reduction in the dimensions of the balancer housing.

Moreover, in accordance with a third aspect of the present invention, in addition to the first or second aspect, there is proposed the engine balancer system wherein the engine is mounted transversely with the crankshaft disposed along the lateral direction of a vehicle body, the higher side of the balancer housing faces the rear of the vehicle body, and the lower side of the balancer housing faces the front of the vehicle body.

In accordance with this arrangement, since the engine is mounted transversely and the higher side and the lower side of the balancer housing face the rear and the front of the vehicle body respectively, it is possible, due to the oil level tilting when the vehicle is accelerating forward, to discharge oil from the oil discharge hole on the higher side of the balancer housing, where it is difficult for oil to be discharged, thereby improving the forward acceleration performance of the vehicle.

Furthermore, in accordance with a fourth aspect of the present invention, in addition to any one of the first to the third aspects, there is proposed the engine balancer system wherein a baffle plate extending from a position lower than the mating faces to a higher position is provided in the lower housing on the higher side of the balancer housing.

In accordance with this arrangement, since the baffle plate extending from the position lower than the mating faces to the higher position is provided on the higher side of the balancer housing where the oil discharge hole is provided in the mating faces of the upper housing and the lower housing, even when the oil level within the oil pan is disturbed it is possible to prevent the oil from penetrating into the interior of the balancer housing via the oil discharge hole formed in the mating faces.

Moreover, in accordance with a fifth aspect of the present invention, in addition to the first aspect, there is proposed the engine balancer system wherein the engine is mounted transversely with the crankshaft disposed in the lateral direction of a vehicle body, the lower side of the balancer housing faces the rear of the vehicle body, and the higher side of the balancer housing faces the front of the vehicle body.

In accordance with this arrangement, since the engine is mounted transversely, the lower side of the balancer housing faces the rear of the vehicle body, and the oil discharge hole is formed in the upper housing above the mating faces on the lower side of the balancer housing, it is possible to suppress the penetration of oil into the interior of the balancer housing via the oil discharge hole even when the oil level is tilted while the vehicle is accelerating forward, thereby suppressing any degradation in the forward acceleration performance of the vehicle.

Furthermore, in accordance with a sixth aspect of the present invention, in addition to the first aspect, there is proposed the engine balancer system having the balancer housing facing the oil pan disposed beneath the crankshaft and having an oil discharge hole for discharging oil that is within the balancer housing formed in an upper face of the balancer housing, wherein the position of an oil outlet at the lower end of an oil return passage formed in an engine block and the position of the oil discharge hole of the balancer housing are displaced from each other.

In accordance with this arrangement, since the position of the oil outlet at the lower end of the oil return passage and the position of the oil discharge hole of the balancer housing are displaced from each other, it is possible to suppress the flow of oil, which has been discharged from the oil outlet of the oil return passage, into the interior of the balancer housing through the oil discharge hole of the balancer housing.

Moreover, in accordance with a seventh aspect of the present invention, in addition to the sixth aspect, there is proposed the engine balancer system wherein the oil discharge hole of the balancer housing is covered by a baffle plate, and the oil outlet of the oil return passage is disposed at a position that avoids the baffle plate.

In accordance with this arrangement, since the oil discharge hole of the balancer housing is covered by the baffle plate, it is possible to prevent oil from flowing into the interior of the balancer housing via the oil discharge hole. Moreover, since the oil outlet of the oil return passage is disposed at the position that avoids the baffle plate, it is possible to smoothly return to the oil pan the oil discharged via the oil outlet without interference from the baffle plate.

Furthermore, in accordance with an eighth aspect of the present invention, in addition to the seventh aspect, there is proposed the engine balancer system wherein an escape section is formed in the baffle plate, the escape section letting the oil discharged via the oil outlet of the oil return passage escape.

In accordance with this arrangement, since the escape section letting the oil discharged via the oil outlet of the oil return passage escape is formed in the baffle plate, it is possible by bringing the oil outlet closer to the baffle plate to suppress any increase in the dimensions of the engine, and to suppress interference by the baffle plate with the oil discharged via the oil outlet.

Moreover, in accordance with a ninth aspect of the present invention, in addition to the eighth aspect, there is proposed the engine balancer system wherein the escape section is formed between fastening parts via which the baffle plate is secured.

In accordance with this arrangement, since the escape section of the baffle plate is formed between the fastening parts via which the baffle plate is secured, it is possible to suppress any degradation in the rigidity of the fastening parts.

Furthermore, in accordance with a tenth aspect of the present invention, in addition to the ninth aspect, there is proposed the engine balancer system wherein an edge of the escape section of the baffle plate is bent downward.

In accordance with this arrangement, since the edge of the escape section of the baffle plate is bent downward, it is possible to smoothly guide the oil discharged via the oil outlet of the oil return passage to the oil pan and, moreover, improve the rigidity of the baffle plate.

A lower block 14 of embodiments corresponds to the engine block of the present invention, bolts 32 and 50 of the embodiments correspond to the fastening parts of the present invention, and first to third baffle plates 47 to 49 of the embodiments correspond to the baffle plate of the present invention.

BRIEF DESCRIPTION OF DRAWINGS

FIG. 1 is a front view of an engine,
FIG. 2 is a sectional view along line 2-2 in FIG. 1,
FIG. 3 is a sectional view along line 3-3 in FIG. 2,
FIG. 4 is a sectional view along line 4-4 in FIG. 2,
FIG. 5 is a sectional view along line 5-5 in FIG. 3,
FIG. 6 is a view from arrowed line 6-6 in FIG. 2,
FIG. 7 is a view from arrowed line 7-7 in FIG. 2,
FIG. 8 is a sectional view along line 8-8 in FIG. 6,
FIG. 9 is a sectional view along line 9-9 in FIG. 6,
FIG. 10 is a sectional view along line 10-10 in FIG. 6,
FIG. 11 is a sectional view along line 11-11 in FIG. 6,
FIG. 12 is a sectional view along line 12-12 in FIG. 6,
and
FIG. 13 is an enlarged view of a part 13 in FIG. 7.
FIG. 16 is a view corresponding to FIG. 3,
FIG. 17 is a sectional view along line 17-17 in FIG. 16,
FIG. 18 is a view from the reverse side of FIG. 17,
and
FIG. 19 is a sectional view along line 19-19 in FIG. 17.

BEST MODE FOR CARRYING OUT THE INVENTION

A first embodiment of the present invention is explained below with reference to FIG. 1 to FIG. 13.

Figure 1:
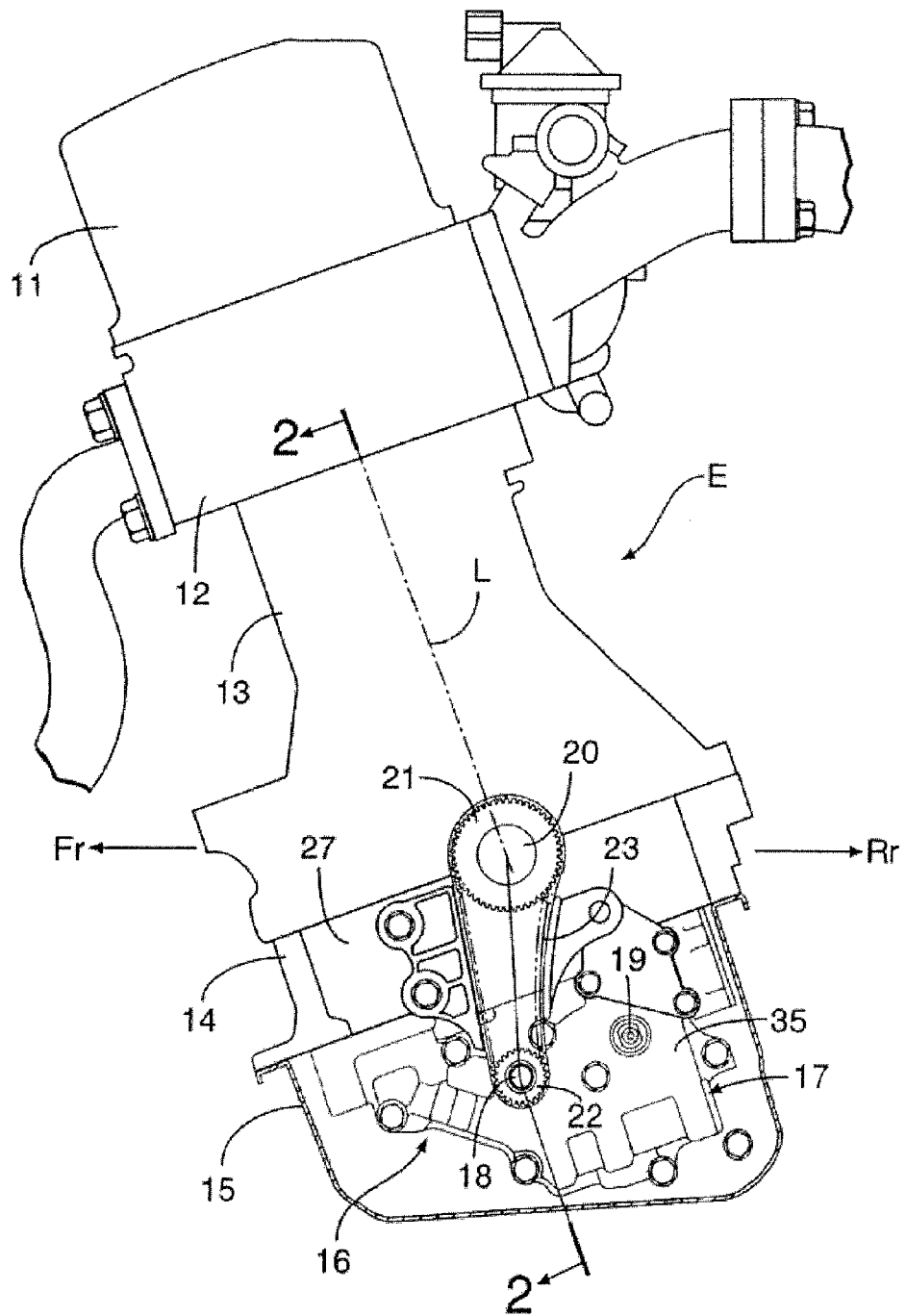
FIG. 1 to FIG. 13 illustrate a first embodiment of the present invention.
Figure 2:
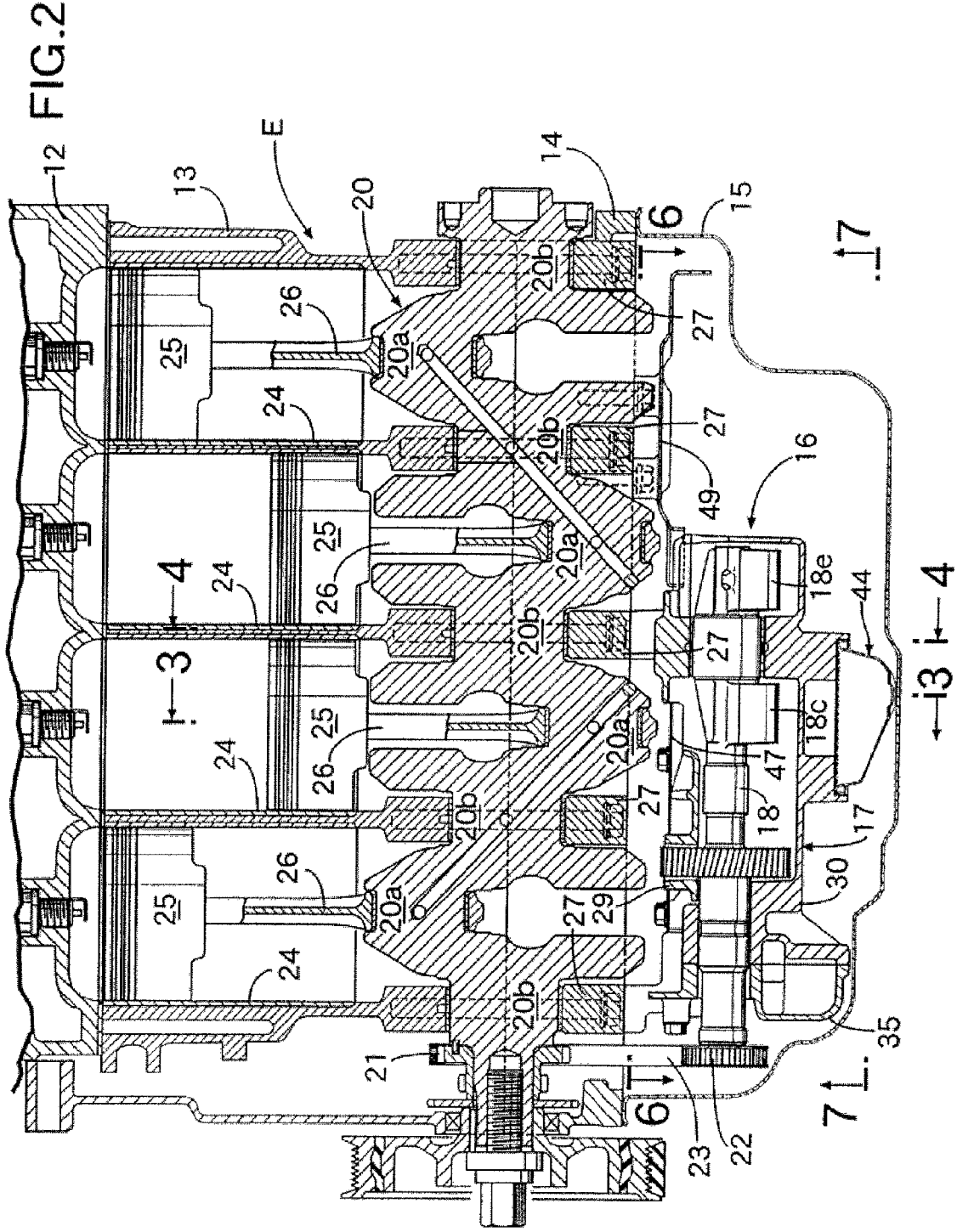

As shown in FIG. 1, an outer shell of a vehicular four cylinder inline engine E is formed by stacking, from the top to the bottom, a head cover 11, a cylinder head 12, a cylinder block 13, a lower block 14, and an oil pan 15. A crankshaft 20 is disposed along the lateral direction of the vehicle body, and a cylinder axis L is inclined toward an exhaust side (the front of the vehicle body) relative to the vertical direction. A secondary balancer system 16 fixed to a lower face of the lower block 14 and housed within the oil pan 15 includes a driven balancer shaft 18 and a follower balancer shaft 19, which are supported in a balancer housing 17. A sprocket 21 provided at a shaft end of the crankshaft 20, which is supported between the cylinder block 13 and the lower block 14, is connected via an endless chain 23 to a sprocket 22 provided at a shaft end of the driven balancer shaft 18.

As shown in FIG. 2 to FIG. 5, four pistons 25 are slidably fitted in four cylinder bores 24 provided in the cylinder block 13, and are connected to four pins 20a of the crankshaft 20 via connecting rods 26. Five bearing caps 27 are fitted within the lower block 14 and are each secured to a lower face of the cylinder block 13 via two bolts 28. Five journals 20b of the crankshaft 20 are rotatably supported between the cylinder block 13 and the five bearing caps 27.

The balancer housing 17 of the secondary balancer system 16 is formed by joining an upper housing 29 and a lower housing 30 via eleven bolts 31, 32, 34a, and 34b provided in the vicinity of an accommodating portion of the housing 17 that accommodates the gears 18b and 19b therein, and further joining a pump housing 35 to end portions of the upper housing 29 and the lower housing 30 via a plurality of bolts 36. An upper wall portion 30b is formed in an end portion of the lower housing 30 on the pump housing 35 side so as to extend over an upper face side of the balancer housing 17, and this upper wall portion 30b is sandwiched between the upper housing 29 and the pump housing 35. A slit-shaped opening α (FIG. 6, FIG. 8, and FIG. 9) is formed between the upper housing 29 and the upper wall portion 30b of the lower housing 30.

The three bolts 31 disposed so as to sandwich the driven balancer shaft 18 and the follower balancer shaft 19 therebetween are inserted from the upper housing 29 side and secured to the lower housing 30. The two bolts 32 disposed outside the driven balancer shaft 18 and the two bolts 31 disposed outside the follower balancer shaft 19 are inserted from the upper housing 29 side and secured to the lower housing 30. The two bolts 34a inserted into the pump housing 35 at one end of the balancer housing 17 run through one of the bearing caps 27 and are secured to the lower face of the cylinder block 13, and the two bolts 34b inserted from the lower housing 30 side at the other end of the balancer housing 17 run through the upper housing 29 and one of the bearing caps 27 and are secured to the lower face of the cylinder block 13.

The upper housing 29 is supported on the bearing caps 27 via four mounts 29a through which the four bolts 34a and 34b run, thereby forming a gap β (see FIG. 4) between an upper face of the upper housing 29 and lower faces of the bearing caps 27. The bolts 31, 32, 34a, 34b are provided between the mounts 29a.

The structure of the secondary balancer system 16 is now explained further with reference to FIG. 6 to FIG. 13.

Figure 8:
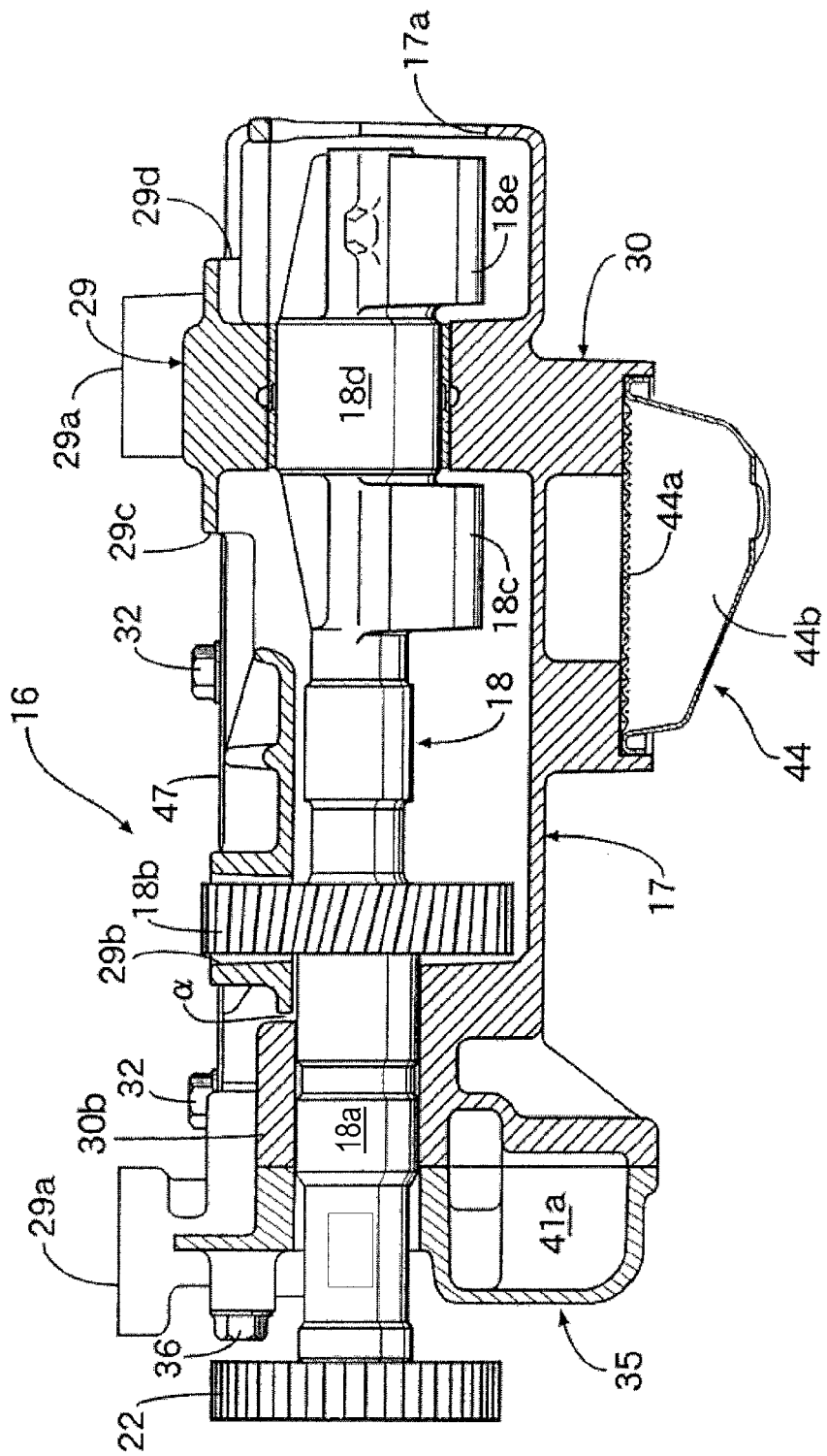
Figure 9:
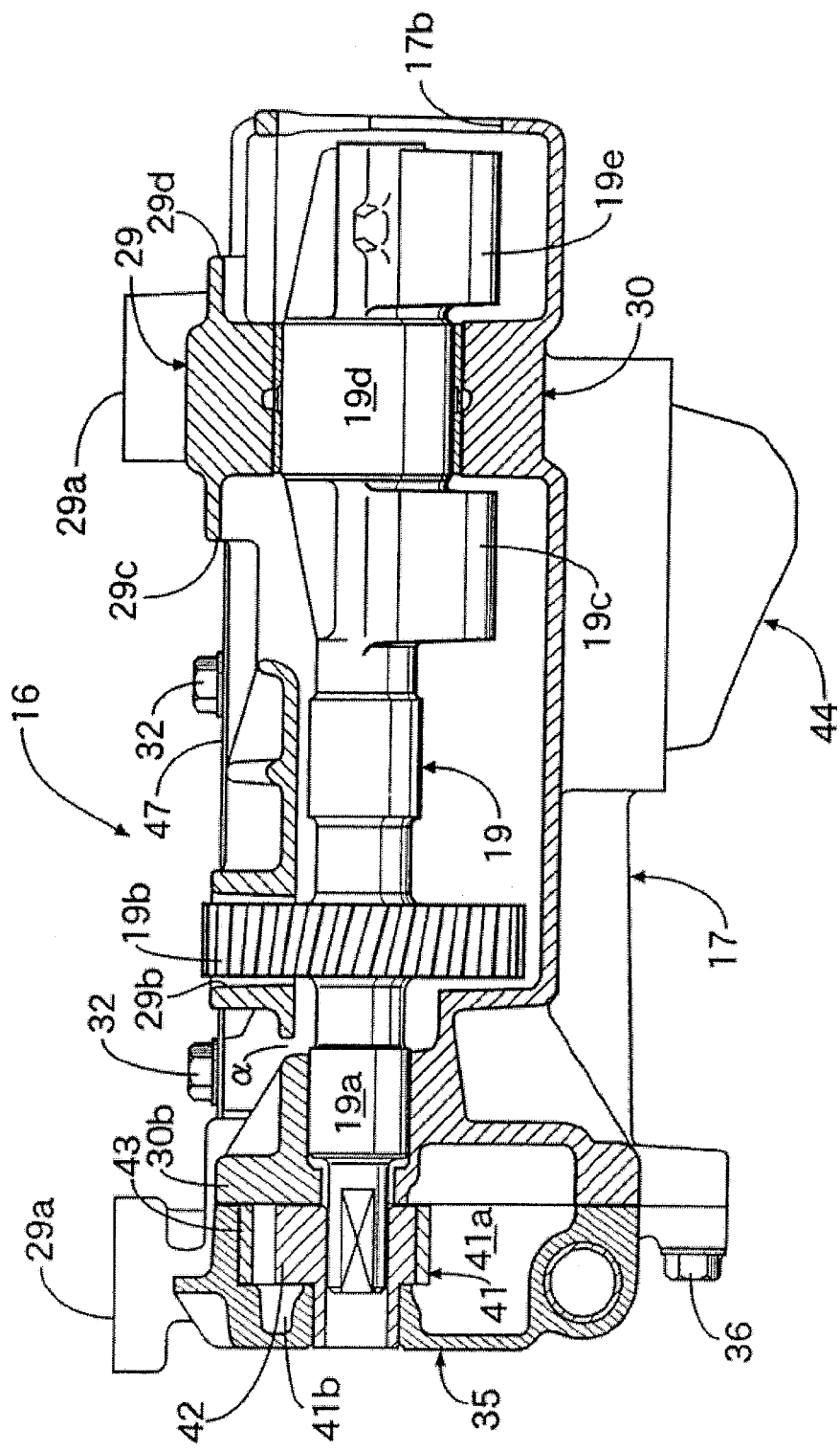

As is clear from FIG. 8, the driven balancer shaft 18 of the secondary balancer system 16 is provided with, going from one end to the other, the sprocket 22, a first journal 18a, a driven gear 18b, a first balancer weight 18c, a second journal 18d, and a second balancer weight 18e. The first and second journals 18a and 18d are sandwiched and supported between the upper housing 29 and the lower housing 30. The first and second journals 18a and 18d are interposed between bolts 31, 32. As is clear from FIG. 9, the follower balancer shaft 19 of the secondary balancer system 16 is provided with, going from one end to the other, a first journal 19a, a follower gear 19b, a first balancer weight 19c, a second journal 19d, and a second balancer weight 19e. The first and second journals 19a and 19d are sandwiched and supported between the upper housing 29 and the lower housing 30. The first and second journals 19a and 19d are interposed between bolts 31, 32. The bolts 31, 32, 34a and 34b are located, with respect to the journal portions 18a, 18d, 19a, 19d, in a direction that is substantially perpendicular to the axes of the balancer shafts 18, 19.

An oil pump 41 (see FIG. 9) is provided at the one end of the follower balancer shaft 19, which projects into the interior of the pump housing 35. The oil pump 41 is a known trochoidal pump, and includes an inner rotor 42 fixed to the follower balancer shaft 19 and an outer rotor 43 rotatably supported by the pump housing 35 and meshing with the inner rotor 42. A strainer 44 is provided on a lower face of the lower housing 30 at a position below an oil level O of oil that is held in the oil pan 15, and the strainer 44 is connected to a suction port 41a of the oil pump 41 via an oil passage 30a (see FIG. 12) formed integrally with the lower face of the lower housing 30. The strainer 44 is formed from a strainer element 44a for filtering out foreign matter in the oil and a strainer cover 44b covering the strainer element 44a. A discharge port 41b of the oil pump 41 is connected to a main gallery 13a (see FIG. 3 and FIG. 4) of the cylinder block 13 via an oil passage (not illustrated).

Formed in the upper housing 29 are a pair of openings 29b facing the driven gear 18b and the follower gear 19b, a pair of openings 29c facing the first balancer weights 18c and 19c, and a pair of openings 29d facing the second balancer weights 18e and 19e. By providing these openings 29b, 29c, and 29d it is possible to prevent a trajectory T (see FIG. 3) of the lower end of the connecting rods 26 from interfering with an upper face of the upper housing 29, thus enabling the engine E to be reduced in size. Formed on an end face of the balancer housing 17 on the side opposite to the pump housing 35 are openings 17a and 17b (see FIG. 10) facing shaft ends of the driven balancer shaft 18 and the follower balancer shaft 19, the openings 17a and 17b extending over the upper housing 29 and the lower housing 30. These openings 17a and 17b are used when machining the interior of the balancer housing 17 so as to form supports for the first and second journals 18a, 19a, 18d, and 19d of the driven balancer shaft 18 and the follower balancer shaft 19. The inner diameters of the openings 17a and 17b are slightly larger than outer diameters of the first and second journals 18a, 19a, 18d, and 19d.

Four oil discharge holes 45a to 45d are formed in an end portion of the upper housing 29 on the driven balancer shaft 18 side, the four oil discharge holes 45a to 45d opening on an upper face of the upper housing 29. Each of the oil discharge holes 45a to 45d is formed in an elongated shape extending along the axial direction of the crankshaft 20. One (or a plurality of) slit-shaped oil discharge hole 46 is formed in the end of the balancer housing 17 on the follower balancer shaft 19 side, the slit-shaped oil discharge hole 46 extending along mating faces of the upper housing 29 and the lower housing 30. The oil discharge holes 45a to 45d open in the direction of the cylinder axis L, and the oil discharge hole 46 opens in a direction orthogonal to the cylinder axis L. Because of the inclination of the cylinder axis L, the balancer housing 17 is inclined so that the driven balancer shaft 18 side (front side of the vehicle body) is low and the follower balancer shaft 19 side (rear side of the vehicle body) is high, but the oil discharge holes 45a to 45d on the driven balancer shaft 18 side and the oil discharge hole 46 on the follower balancer shaft 19 side are disposed at positions higher than the horizontal oil level O (see FIG. 3) of the oil that is held in the oil pan 15.

A substantially rectangular first baffle plate 47 is secured to an upper face of the end of the upper housing 29 on the driven balancer shaft 18 side via the two bolts 32, which also join the upper housing 29 and the lower housing 30. A substantially rectangular second baffle plate 48 is fixed via two bolts 33 to a bank-shaped boss 30c projectingly provided on an outer wall of the lower housing 30. The second baffle plate 48 extends upward and rearward along the outer wall of the lower housing 30, and its upper end reaches a position higher than the upper end of the oil discharge hole 46. A large number of through holes 30d (see FIG. 12 and FIG. 13) are formed in the bank-shaped boss 30c, the through holes 30d providing communication between an upper face and a lower face of the bank-shaped boss 30c. A rectangular U-shaped third baffle plate 49 is fixed to the lower face of the lower block 14 via four bolts 50.

When the engine E is running, rotation of the crankshaft 20 is transmitted to the driven balancer shaft 18 via the sprocket 21, the endless chain 23, and the sprocket 22, and rotation of the driven balancer shaft 18 is transmitted to the follower balancer shaft 19 via the driven gear 18b and the follower gear 19b. Since the number of teeth of the sprocket 21 of the crankshaft 20 is set so as to be twice the number of teeth of the sprocket 22 of the driven balancer shaft 18, and the number of teeth of the driven gear 18b is set so as to be equal to the number of teeth of the follower gear 19b, the driven balancer shaft 18 and the follower balancer shaft 19 rotate in opposite directions to each other (see arrows A and B in FIG. 11 and FIG. 12) at a rotational speed that is twice the rotational speed of the crankshaft 20, and secondary vibration of the engine E is damped by the first and second balancer weights 18c, 19c, 18e, and 19e provided on the driven balancer shaft 18 and the follower balancer shaft 19.

While the engine E is running, since the crankshaft 20 splashes oil within the crankcase, the oil attempts to penetrate into the interior of the balancer housing 17 via the openings 29b, 29c, 29d, 17a, and 17b. When the oil penetrates into the interior of the balancer housing 17, the oil is stirred by the driven gear 18b, the follower gear 19b, the first and second balancer weights 18c, 19c, 18e, and 19e, etc. and there is the problem that the stirring resistance increases. By discharging, via the oil discharge holes 45a to 45d and 46 of the balancer housing 17, the oil swept up by the driven gear 18b, the follower gear 19b, the first and second balancer weights 18c, 19c, 18e, and 19e, etc. of the driven balancer shaft 18 and the follower balancer shaft 19 rotating in the directions of arrows A and B in FIG. 11 so as to return it to the oil pan 15, an increase in the stirring resistance is prevented.

Figure 10:
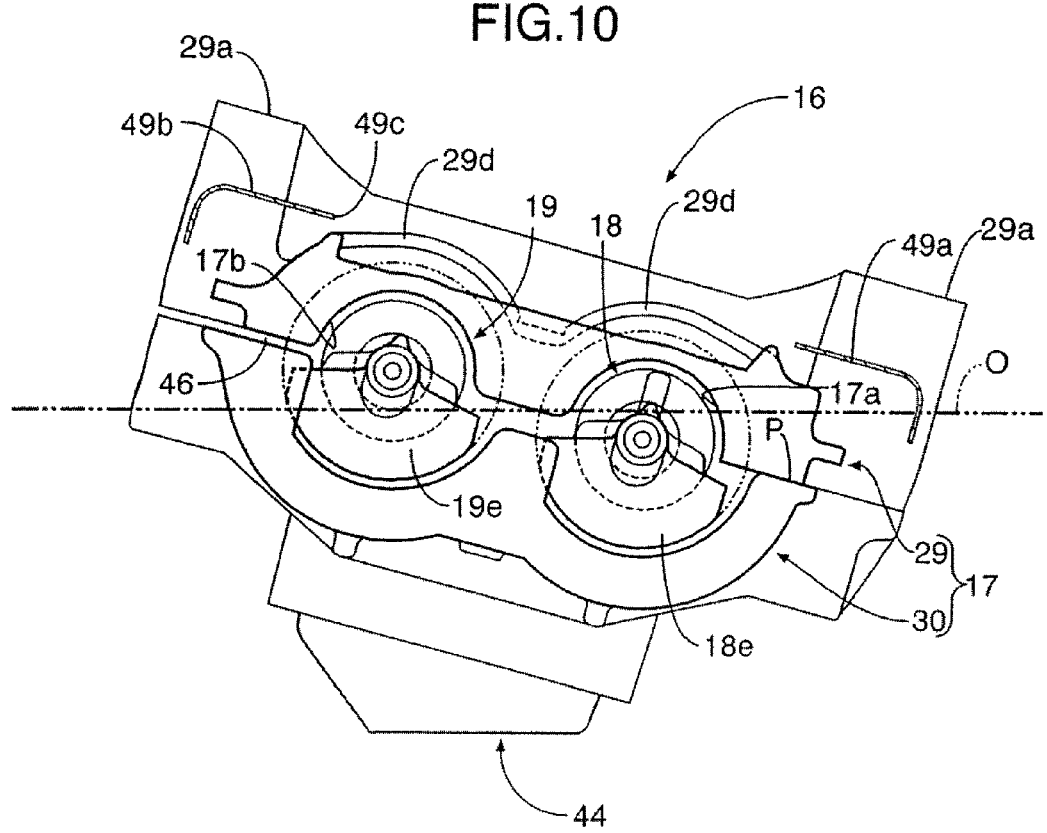
Figure 11:
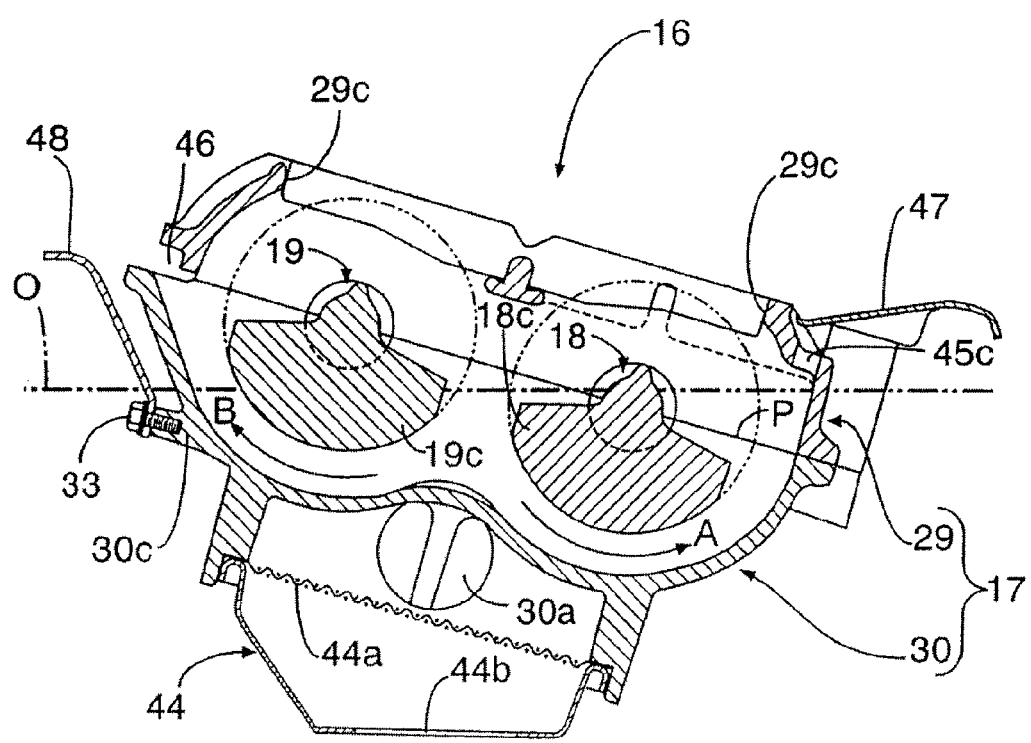
Figure 12:
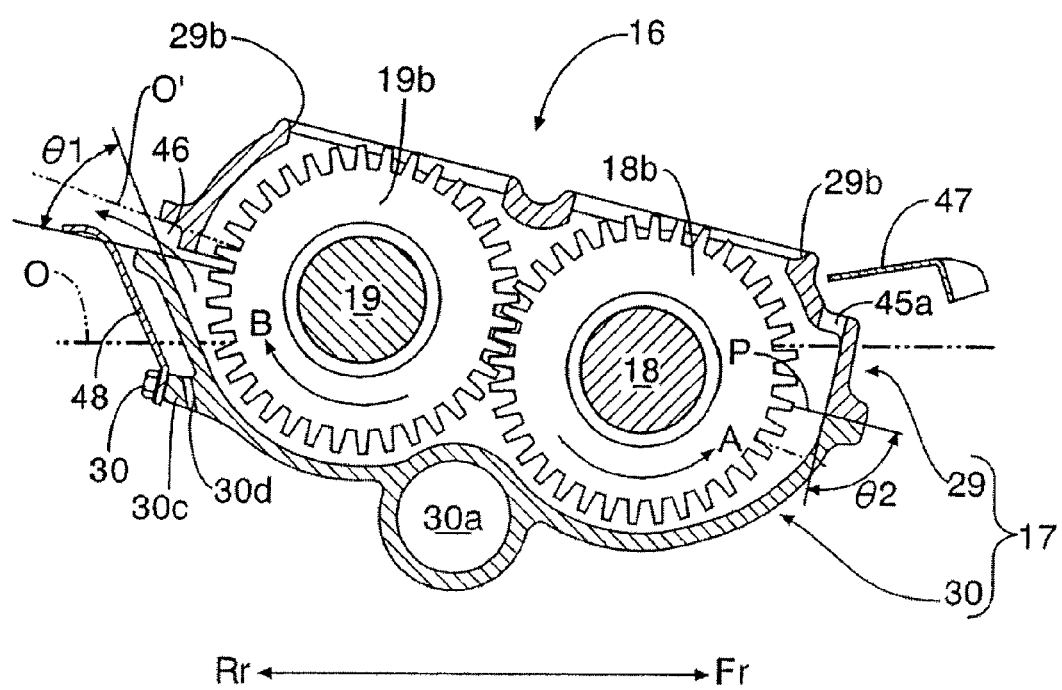

During this process, as shown in FIG. 10 to FIG. 12, since outer edges of the first and second baffle plates 47 and 48 and outer edges of cover portions 49a and 49b of the third baffle plate 49 are bent downward, the oil discharged via the oil discharge holes 45a to 45d and 46 is diverted downward and the oil can be returned smoothly to the oil pan 15.

The first baffle plate 47 and the second baffle plate 48 fixed to the balancer housing 17 and the third baffle plate 49 fixed to the lower block 14 prevent the oil level O of oil that resides within the oil pan 15 from being disturbed. Since at least portions of the first and third baffle plates 47 and 49 extend to positions that cover the oil discharge holes 45a to 45d of the balancer housing 17, when droplets of the oil splashed accompanying rotation of the crankshaft 20 are scattered within the crankcase, the droplets of oil are blocked by the first and third baffle plates 47 and 49, and it is thus possible to suppress their penetration into the interior of the balancer housing 17 via the oil discharge holes 45a to 45d. In this way, since the oil discharge holes 45a to 45d are covered by utilizing the existing first and third baffle plates 47 and 49, it is unnecessary to employ a special cover member for covering these oil discharge holes 45a to 45d, thus reducing the number of components and the number of assembly steps.

In particular, since the third baffle plate 49, which is rectangular U-shaped, is provided with a plurality of cover portions 49a and 49b, which cover the oil discharge hole 45d and a part of the oil discharge hole 46, and with a cutout 49c between the cover portions 49a and 49b, the cutout 49c makes it possible to minimize any increase in weight of the third baffle plate 49 while enabling the oil discharge hole 45d and the part of the oil discharge hole 46 to be covered by the cover portions 49a and 49b. Moreover, since two of the four bolts 50 for fixing the third baffle plate 49 to the lower block 14 are disposed at positions closer to the cover portions 49a and 49b than to the cutout 49c, it is possible to increase the rigidity of the cover portions 49a and 49b and suppress vibration. Furthermore, since the cutout 49c is provided at a position where it faces the second balancer weights 18e and 19e, which have a larger diameter than that of the second journals 18d and 19d of the driven balancer shaft 18 and the follower balancer shaft 19, it is possible to minimize any increase in the vertical dimension of the engine E.

Since the first baffle plate 47 in the role of a cover member covers the oil discharge holes 45a to 45c, which are a plurality of openings, and the third baffle plate 49 in the role of a cover member covers the oil discharge holes 45d and 46, which are a plurality of openings, that is, a plurality of openings are covered by a single cover member in each case, it is possible to reduce the number of cover members.

Since the first baffle plate 47 and the third baffle plate 49, which cover the oil discharge holes 45c and 45d respectively provided to the side (in a direction orthogonal to the driven balancer shaft 18) of the first balancer weight 18c and the second balancer weight 18e provided on either side of the second journal 18d, are provided independently as separate bodies, it is possible to suppress any increase in the dimensions of the first and third baffle plates 47 and 49 as cover members while avoiding a complicated arrangement for the connection of the first baffle plate 47 and the third baffle plate 49 in the area around the second journal 18d.

Moreover, since the cylinder axis L is inclined toward the front of the vehicle body so that the front side of the balancer housing 17 is low and the rear side thereof is high, it is easy for oil to flow into the interior of the balancer housing 17 via the front side oil discharge holes 45a to 45d, but since the front side oil discharge holes 45a to 45d are formed at positions higher than the mating faces P of the upper housing 29 and the lower housing 30, that is, formed so as to run through an upper wall of the upper housing 29, it is possible to prevent effectively the inflow of oil via the oil discharge holes 45a to 45d. On the other hand, since the rear side oil discharge hole 46 is at a high position, even when the oil discharge hole 46 is formed in the mating faces P of the upper housing 29 and the lower housing 30, thus simplifying the structure, there is no possibility of a large amount of oil flowing in therethrough.

As is clear from FIG. 12, an angle θ1, which is formed between the lower housing 30 and the mating faces P of the upper housing 29 and the lower housing 30 on the side (the rear side of the vehicle body) where the balancer housing 17 is high, is smaller than an angle θ2, which is formed between the lower housing 30 and the mating faces P on the side (the front side of the vehicle body) where the balancer housing 17 is low. That is, the inclination of an inner face of the lower housing 30 is shallow on the rear side of the vehicle body where it is difficult for oil to be discharged because the position of the oil discharge hole 46 is high, and in contrast the inclination of the inner face of the lower housing 30 is steep on the front side of the vehicle body where it is easy for oil to be discharged because the position of the oil discharge hole 46 is low. Therefore, when the oil level is inclined from the normal position O to a position O' during forward acceleration of the vehicle, it is also possible to discharge effectively oil that is within the balancer housing 17 via the oil discharge hole 46, which is at a high position on the rear side of the vehicle body.

Moreover, since the inclination of the lower housing 30 is steep on the side where the balancer housing 17 is low (the front side of the vehicle body), it is possible to contribute to a reduction in the dimensions of the balancer housing 17 by bringing the lower housing 30 closer to the driven balancer shaft 18 in that area.

Furthermore, since the upper end of the second baffle plate 48 reaches a position higher than the upper end of the oil discharge hole 46, even when the oil level within the oil pan 15 is disturbed, it is possible to prevent oil from penetrating into the interior of the balancer housing 17 via the oil discharge hole 46. Furthermore, even when oil flows in between the outer wall of the lower housing 30 and the second baffle plate 48, the oil can be returned to the oil pan 15 via the through holes 30d formed in the boss 30c of the lower housing 30.

Figure 14:
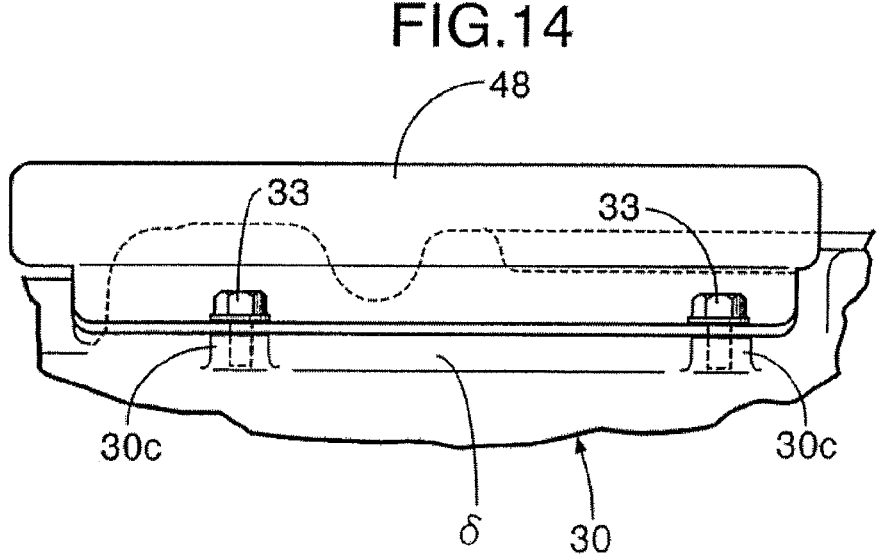
FIG. 14 is a view, corresponding to FIG. 13, of a second embodiment of the present invention.

A second embodiment of the present invention is now explained with reference to FIG. 14.

Figure 13:
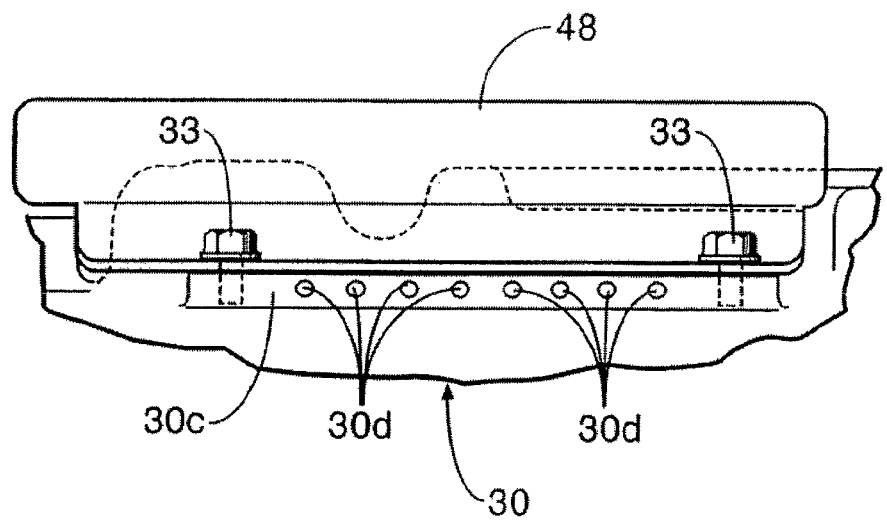

In the first embodiment shown in FIG. 13, the second baffle plate 48 is fixed to the one bank-shaped boss 30c provided on the outer wall of the lower housing 30 via the bolts 33, but in the second embodiment a second baffle plate 48 is fixed, via bolts 33, to two bosses 30c provided on an outer wall of a lower housing 30, the two bosses 30c being separated from each other. A gap δ is therefore formed between the two bosses 30c, the outer wall of the lower housing 30, and the second baffle plate 48. Oil that has flowed in between the outer wall of the lower housing 30 and the second baffle plate 48 is returned to the oil pan 15 via the gap δ.

A third embodiment of the present invention is now explained with reference to FIG. 15.

Figure 3:
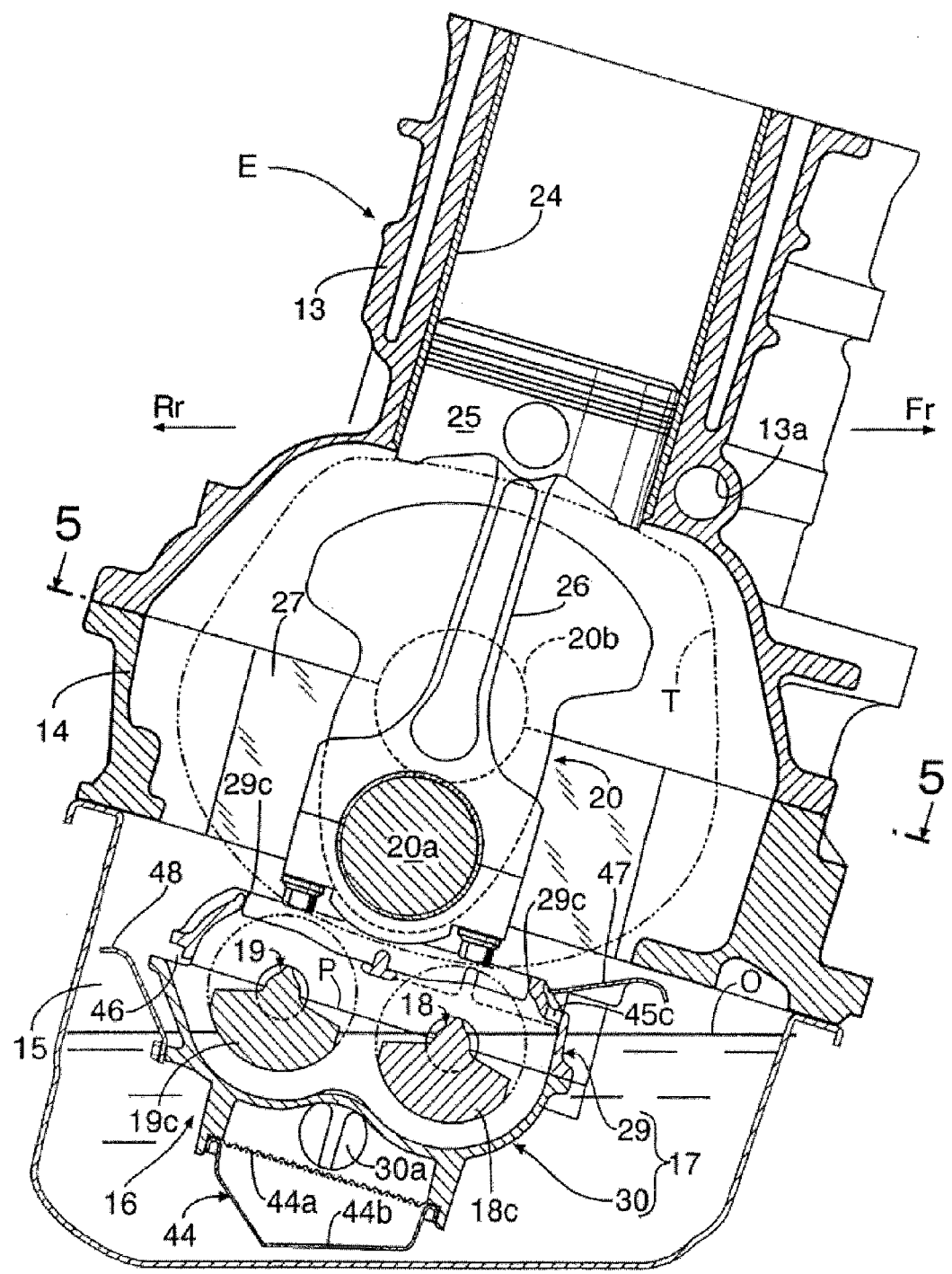
Figure 4:
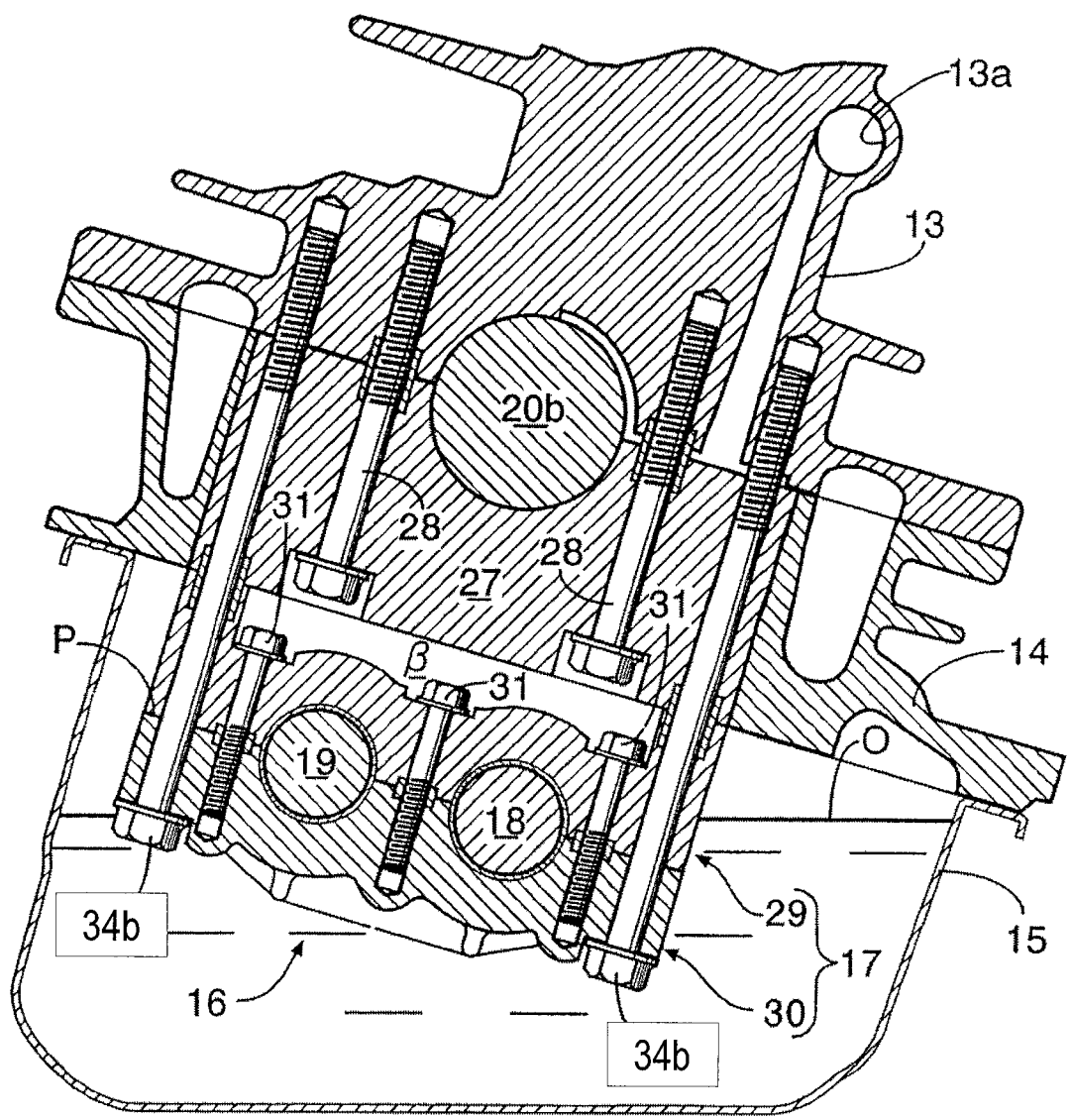
Figure 5:
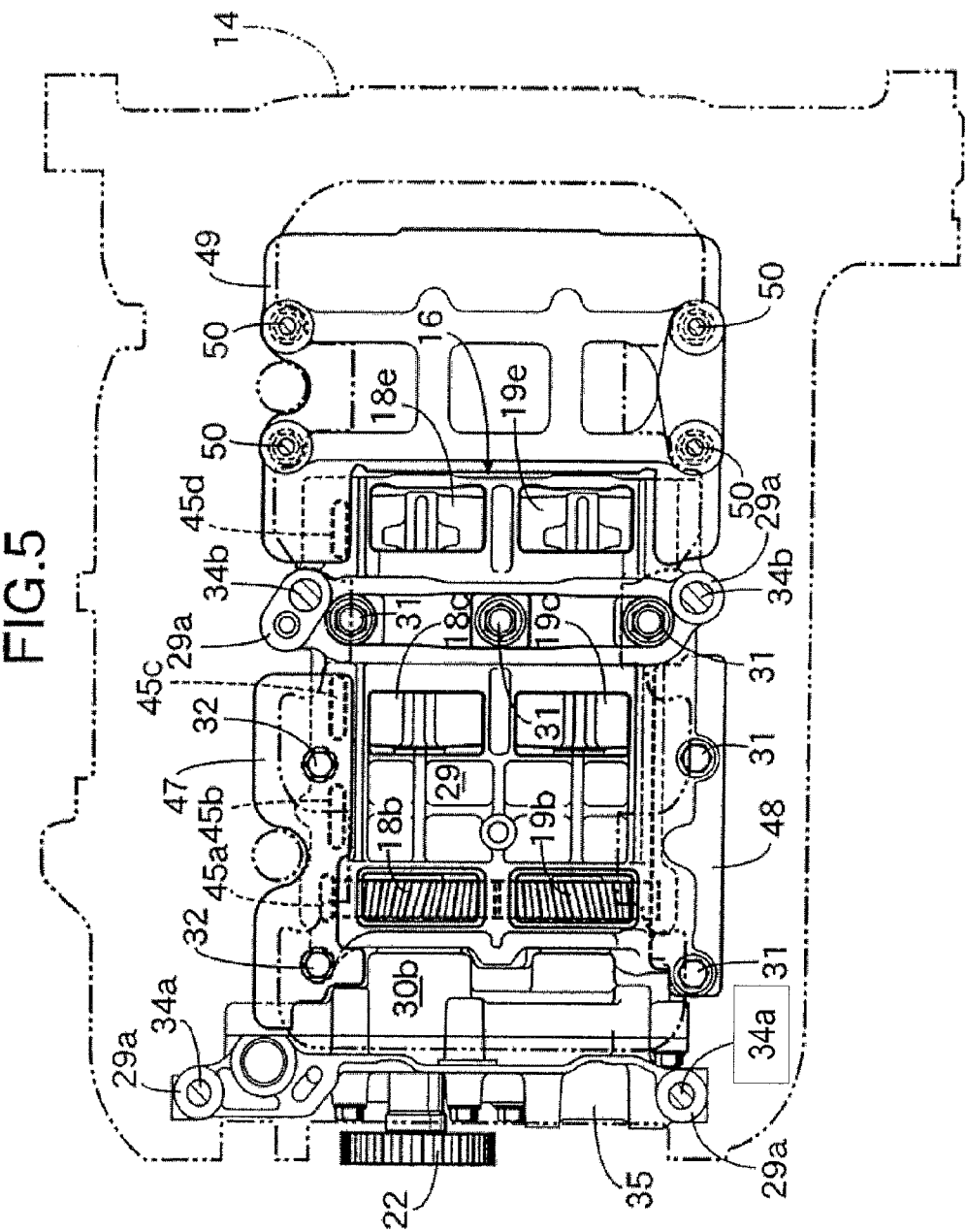
Figure 15:
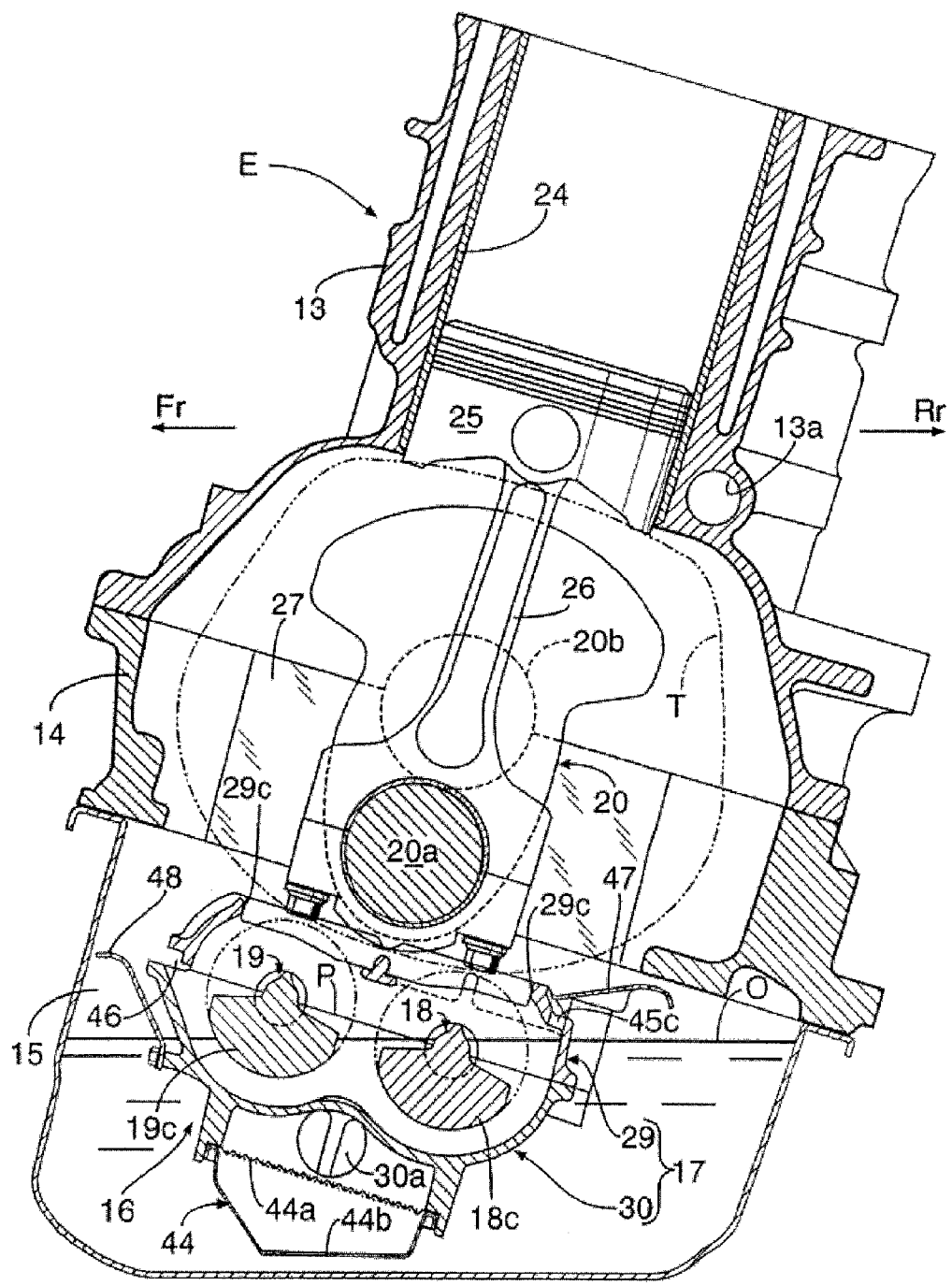
FIG. 15 is a view, corresponding to FIG. 3, of a third embodiment of the present invention.

As is clear from comparing FIG. 15 with FIG. 3 (the first embodiment), in the third embodiment a driven balancer shaft 18 side of a balancer housing 17 faces the rear of a vehicle body, and a follower balancer shaft 19 side thereof faces the front of the vehicle body. Therefore, even when the oil level on the driven balancer shaft 18 side rises during forward acceleration of the vehicle, since oil discharge holes 45a to 45d on the driven balancer shaft 18 side are formed in an upper face of the balancer housing 17, it is difficult for oil to penetrate into the interior of the balancer housing 17 via the oil discharge holes 45a to 45d, and it is possible to suppress degradation of the forward acceleration performance of the vehicle. If the oil discharge holes 45a to 45d on the low side of the balancer housing 17 are provided at positions higher than mating faces on the high side of the balancer housing 17, degradation of the forward acceleration performance of the vehicle is yet further advantageously suppressed.

A fourth embodiment of the present invention is now explained with reference to FIG. 16 to FIG. 19.

Figure 6:
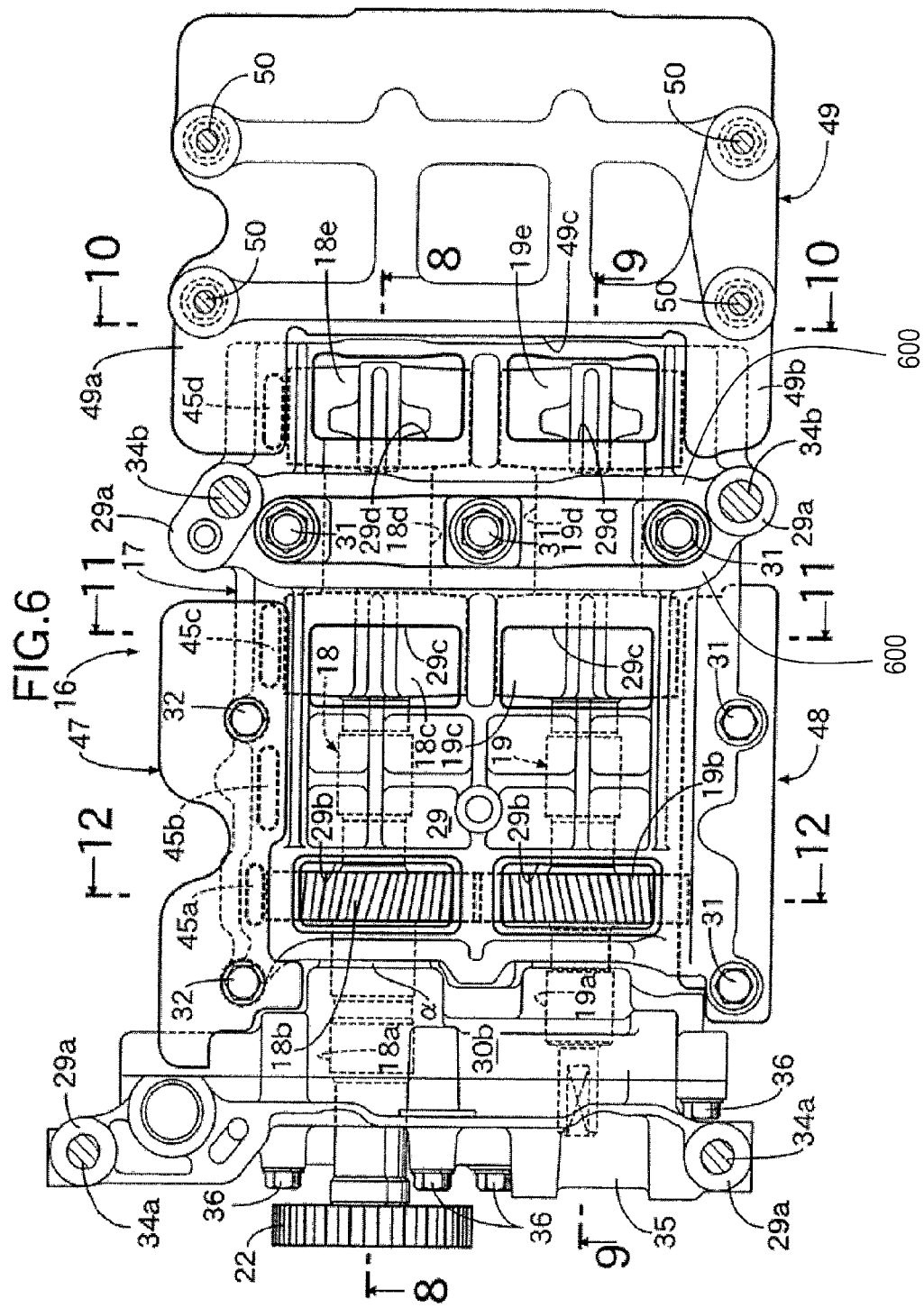
Figure 7:
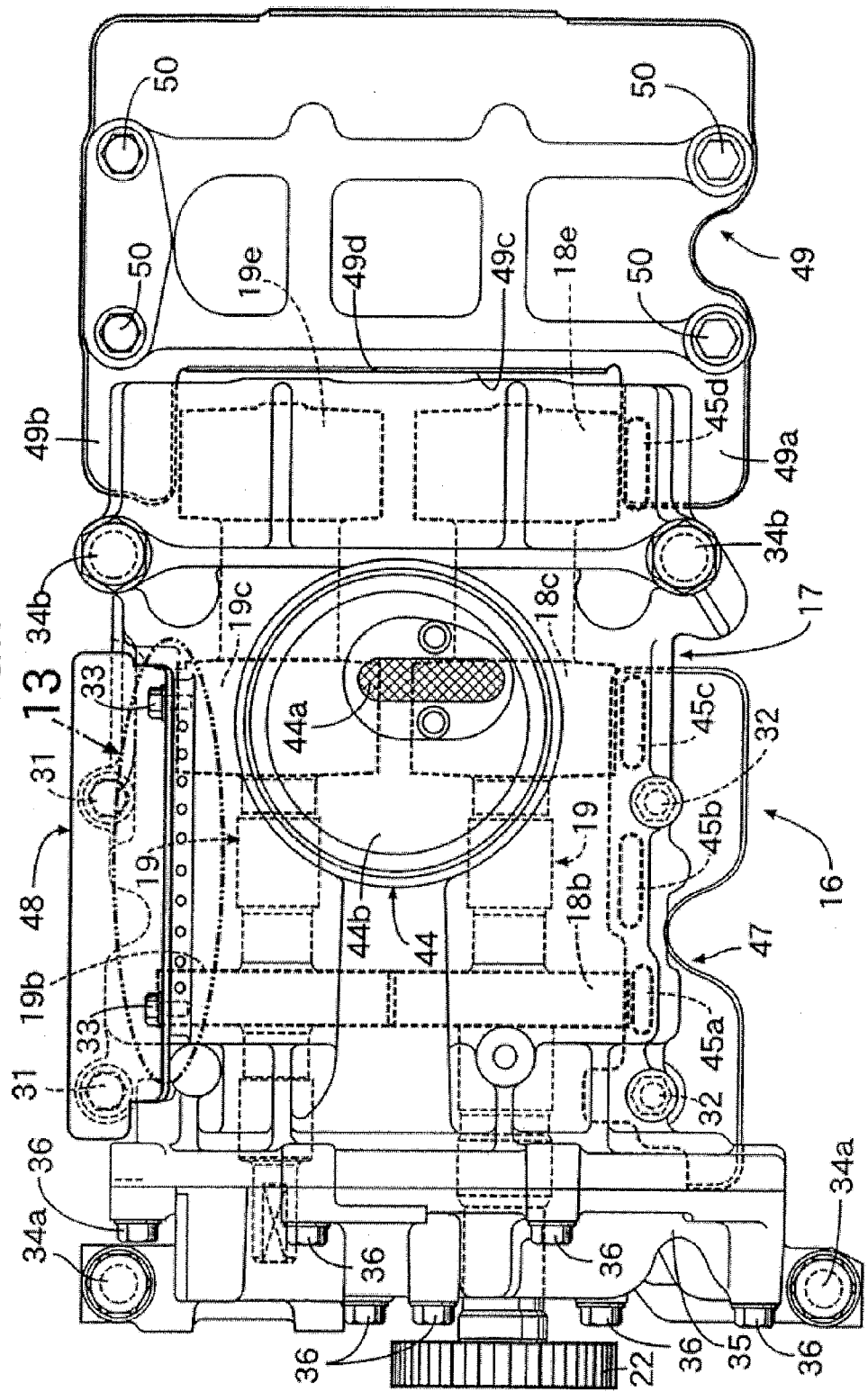
Figure 16:
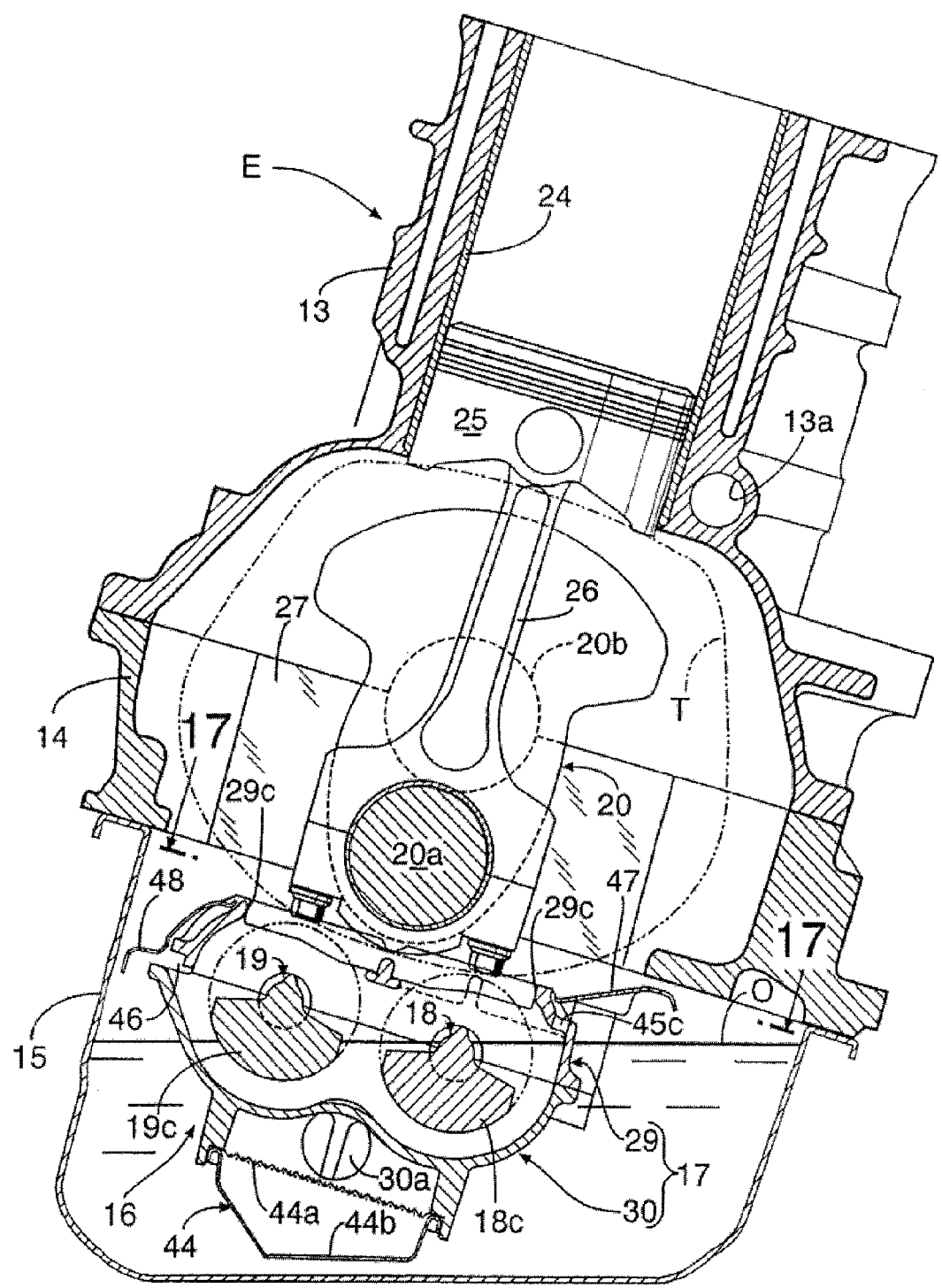
FIG. 16 to FIG. 19 illustrate a fourth embodiment of the present invention.
Figure 17:
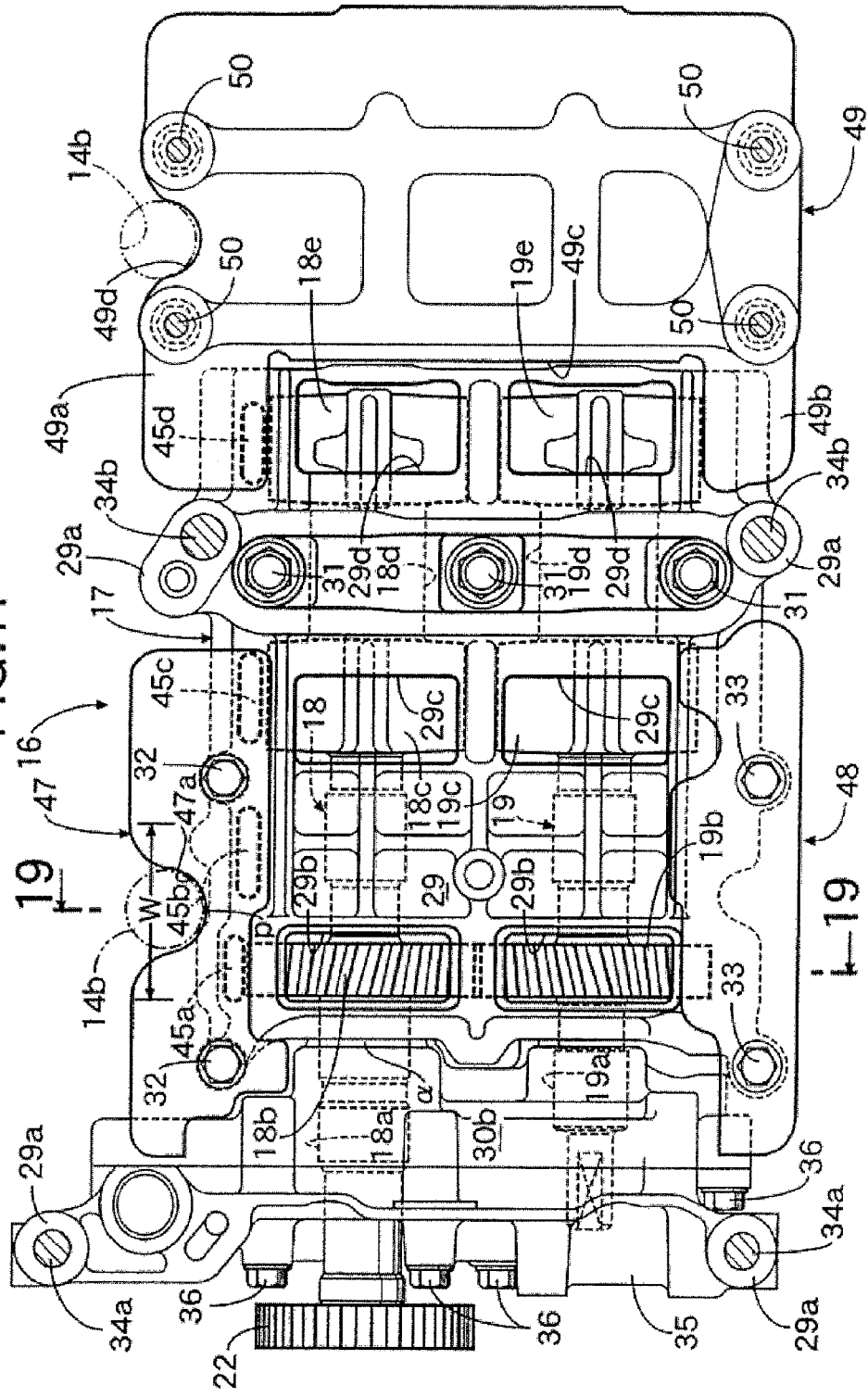
Figure 18:
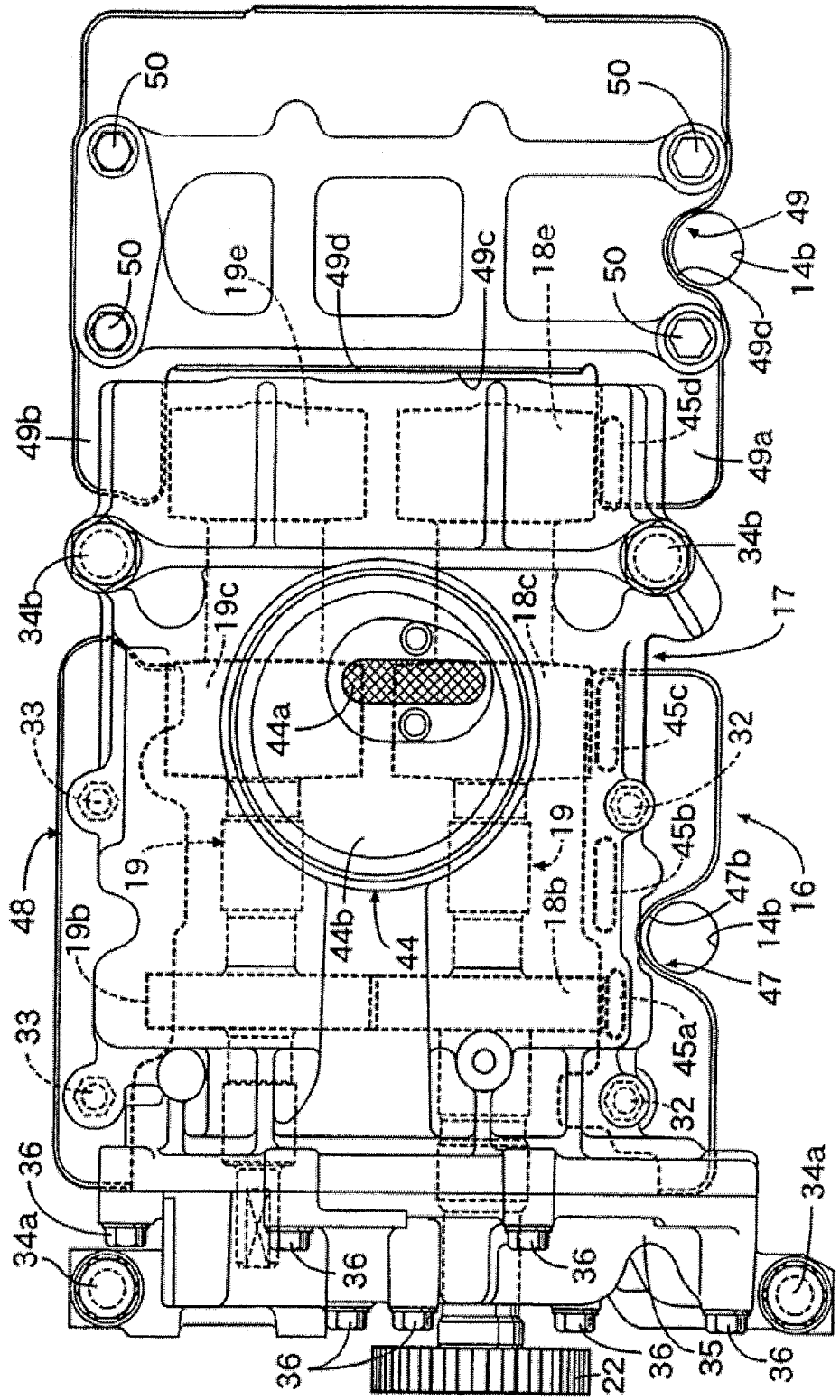
Figure 19:
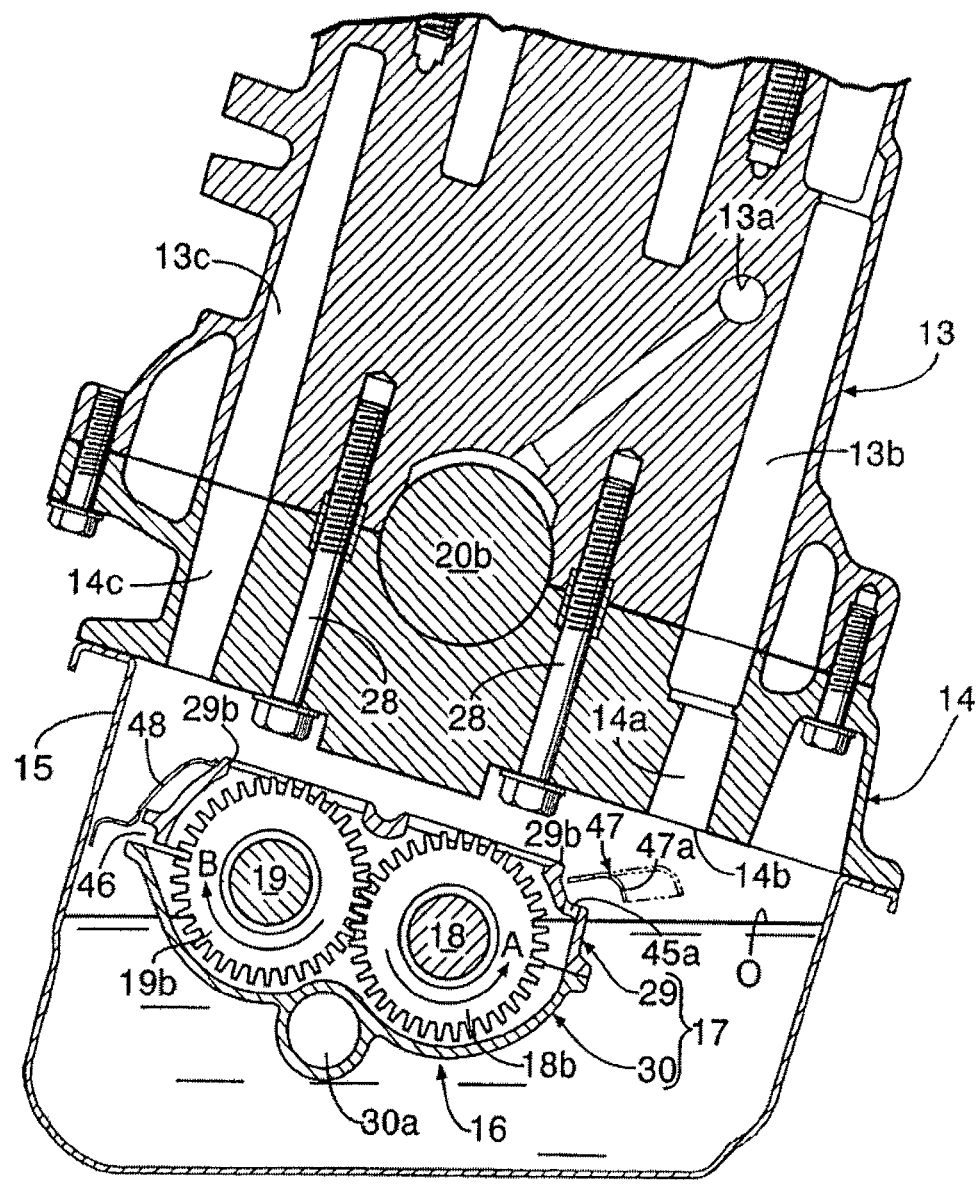

As is clear from a comparison of FIG. 6 and FIG. 11 (the first embodiment) with FIG. 16 and FIG. 17 (the fourth embodiment), whereas the second baffle plate 48 of the first embodiment is fixed via the two bolts 33 to the bank-shaped boss 30c projectingly provided on the outer wall of the lower housing 30, a second baffle plate 48 of the fourth embodiment is secured to an upper face of the end on a follower balancer shaft 19 side of an upper housing 29 via two bolts 33, which also join the upper housing 29 and a lower housing 30.

A first baffle plate 47 and the second baffle plate 48 fixed to a balancer housing 17 and a third baffle plate 49 fixed to a lower block 14 prevent an oil level O of oil held within an oil pan 15 from being disturbed. Since at least parts of the first to the third baffle plates 47 to 49 extend to positions where they cover oil discharge holes 45a to 45d and 46 of the balancer housing 17, when droplets of oil splashed accompanying rotation of a crankshaft 20 are scattered within a crankcase, the droplets of oil are blocked by the first to the third baffle plates 47 to 49, and it is thus possible to suppress their penetration into the interior of the balancer housing 17 via the oil discharge holes 45a to 45d and 46. In this way, since the oil discharge holes 45a to 45d and 46 are covered by utilizing the existing first to third baffle plates 47, 48, and 49, it is unnecessary to employ a special cover member for covering these oil discharge holes 45a to 45d and 46, thus reducing the number of components and the number of assembly steps.

Formed in a cylinder block 13 and the lower block 14 are two oil return passages 13b and two oil return passages 14a for returning to the oil pan 15 oil that has lubricated a valve operating mechanism, etc. within a cylinder head 12. An oil outlet 14b at the lower end of one of the oil return passages 14a of the lower block 14 faces a cutout-shaped escape section 47a formed by indenting the outer edge of the first baffle plate 47 in a semicircular shape. An oil outlet 14b at the lower end of the other oil return passage 14a of the lower block 14 faces a cutout-shaped escape section 49d formed by indenting the outer edge of the third baffle plate 49 in a semicircular shape. Since the escape sections 47a and 49d are cutout-shaped and are formed by indenting in a semicircular shape, the molding thereof is easy. Reference numerals 13c and 14c in FIG. 19 denote a breather passage.

As is most clearly shown in FIG. 17, since the oil outlet 14b of the one of the oil return passages 14a is at a position that is offset from the oil discharge holes 45a and 45b that are the closest thereto, the oil outlet 14b of the other oil return passage 14a is at a position that is offset from the oil discharge hole 45d that is the closest thereto and, moreover, these oil discharge holes 45a, 45b, and 45d are covered by the first and third baffle plates 47 and 49, it is possible to prevent effectively the oil that has dropped via the oil outlets 14b from flowing into the interior of the balancer housing 17 via the oil discharge holes 45a, 45b, and 45d.

Since the oil outlets 14b of the oil return passages 14a are positioned so as to avoid the first and third baffle plates 47 and 49, that is, the oil outlets 14b face the escape sections 47a and 49d of the first and third baffle plates 47 and 49, it is possible, without making the first and third baffle plates 47 and 49 especially compact, to smoothly return to the oil pan 15 oil that has been discharged via the oil outlets 14b while suppressing interference from the first and third baffle plates 47 and 49. Moreover, since outer edges of the first and third baffle plates 47 and 49, which include positions surrounding the escape sections 47a and 49d, are bent downward, it is possible to yet more smoothly return to the oil pan 15 oil discharged via the oil outlets 14b by guiding it downward.

Furthermore, since the escape section 47a of the first baffle plate 47 is formed between two bolts 32 via which the first baffle plate 47 is fixed to the balancer housing 17, even when fastening bosses for the bolts 32 are sufficiently thick, the fastening bosses do not project into the escape section 47a, and the rigidity with which the first baffle plate 47 is secured can thereby be enhanced. Similarly, since the escape section 49d of the third baffle plate 49 is formed between two bolts 50 via which the third baffle plate 49 is fixed to the lower block 14, even when fastening bosses for the bolts 50 are sufficiently thick, the securing bosses do not project into the escape section 49d, and the rigidity with which the third baffle plate 49 is secured can thereby be enhanced.

As is clear from FIG. 17, since the innermost end p of the escape section 47a of the first baffle plate 47 is positioned between facing ends of the two oil discharge holes 45a and 45b that are positioned close to the escape section 47a, it is possible to ensure that there is a minimum distance from the escape section 47a to the two oil discharge holes 45a and 45b, and it is thus possible to suppress the penetration of oil from the oil outlet 14b into the oil discharge holes 45a and 45b. Furthermore, by increasing the distance between the two oil discharge holes 45a and 45b and moving the positions of the facing end portions thereof outside a width W of the escape section 47a, the effect of suppressing the penetration of oil into the oil discharge holes 45a and 45b can be further improved.

Embodiments of the present invention are explained in detail above, but the present invention can be modified in a variety of ways without departing from the spirit and scope thereof.

For example, in the first to the fifth embodiments the first and second baffle plates 47 and 48 are fixed to the balancer housing 17 and the third baffle plate 49 is fixed to the lower block 14, but the positions at which they are mounted may be changed as appropriate.

Furthermore, in the fourth and fifth embodiments the escape sections 47a and 49d of the first and third baffle plates 47 and 49 are cutouts, but they may be holes.

Figure 20:
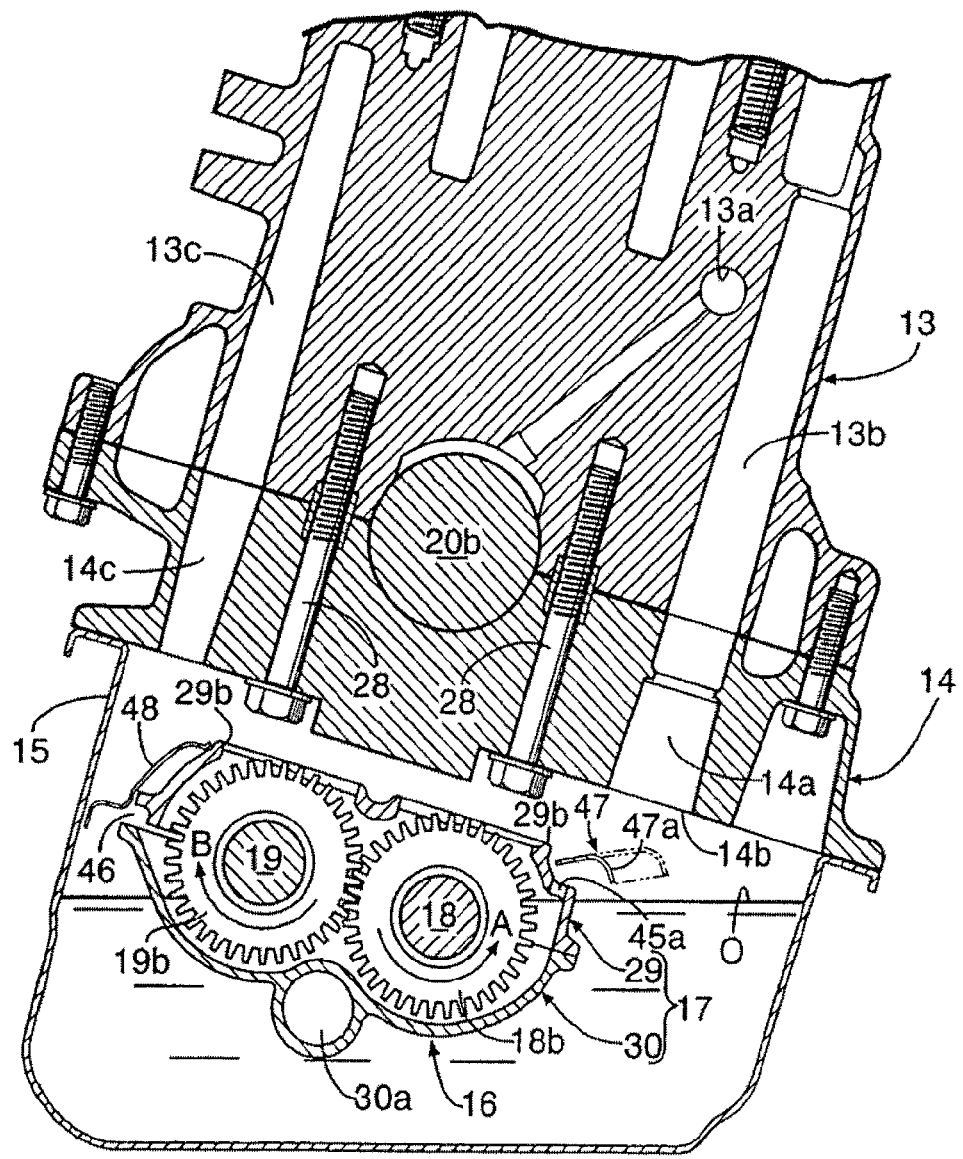
FIG. 20 is a view, corresponding to FIG. 19, of a fifth embodiment of the present invention.

Moreover, in the fourth embodiment the diameter of the oil outlets 14b is set so as to be smaller than that of the escape sections 47a and 49d but, as in a fifth embodiment shown in FIG. 20, the diameter of oil outlets 14b may be set so as to be larger than that of escape sections 47a and 49d, or parts of the oil outlets 14b may be offset from the escape sections 47a and 49d.

Furthermore, the shape and the number of the oil discharge holes 45a to 45d and 46 may be changed as appropriate.

INDUSTRIAL APPLICABILITY

As hereinbefore described, the present invention can be applied suitably to an engine balancer system having a balancer housing formed by joining an upper housing and a lower housing via mating faces, the balancer housing being disposed so as to face an oil pan beneath a crankshaft of an engine.

The invention claimed is:

1. An engine balancer system having a balancer housing formed by joining an upper housing and a lower housing via mating faces, the balancer housing being disposed so as to face an oil pan beneath a crankshaft of an engine, a plurality of balancer shafts each having a balancer weight are sandwiched and rotatably supported between said upper and lower housings, and mutually meshed gears are provided on said balancer shafts, wherein said balancer housing is formed with an accommodating portion for accommodating said gears therein, and bolts for joining said upper and lower housings together are provided around said accommodating portion, and wherein that portion of the upper housing which defines the accommodating portion of the balancer housing is formed with an opening to which said gears face.

2. The engine balancer system according to claim 1, wherein said plurality of balancer shafts are provided with journal portions, which are supported on said balancer housing, at positions adjacent to said gears, and said bolts are located with respect to said journal portions in a direction substantially perpendicular to axes of said balancer shafts.

3. The engine balancer system according to claim 2, wherein said bolts are provided on opposite sides of the balancer housing with said journal portions of the balancer shafts being interposed therebetween.

4. The engine balancer system according to claim 1, wherein a plurality of mounts for joining said balance housing to an engine body are provided at positions on opposite end sides of the balancer shafts and said bolts are provided between said plurality of mounts.

5. The engine balancer system according to claim 4, wherein a pump housing is mounted on one of opposite end sides of the balancer housing and those of the mounts which are located on said one of opposite end sides of the balancer housing are provided on said pump housing, and said bolts are mounted between said accommodating portion and said mounts on said one of opposite end sides of the balancer housing.

* * * * *